Nov. 13, 1956  B. ULVAD  2,770,160
MUSIC STUDY DEVICE
Filed Dec. 15, 1953  2 Sheets-Sheet 1

INVENTOR
BERNHARD ULVAD
BY
ATTORNEY

Nov. 13, 1956 — B. ULVAD — 2,770,160
MUSIC STUDY DEVICE
Filed Dec. 15, 1953 — 2 Sheets-Sheet 2
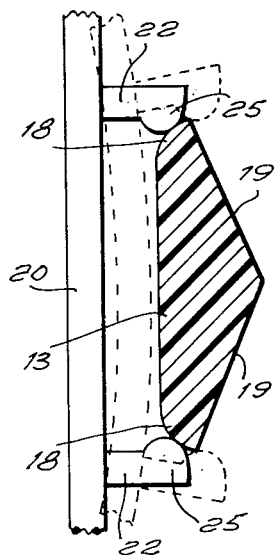
FIG.7.
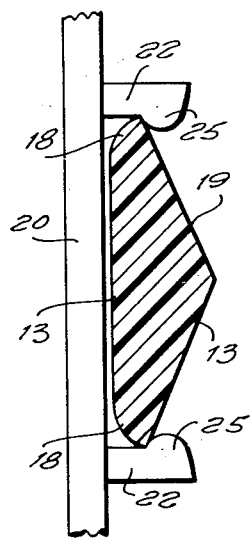
FIG.8.
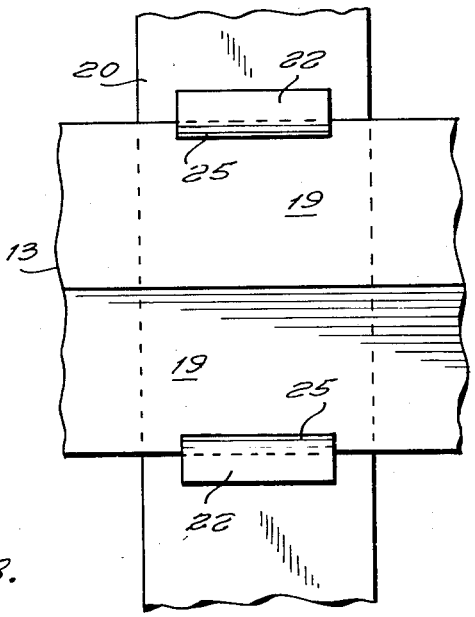
FIG.9.
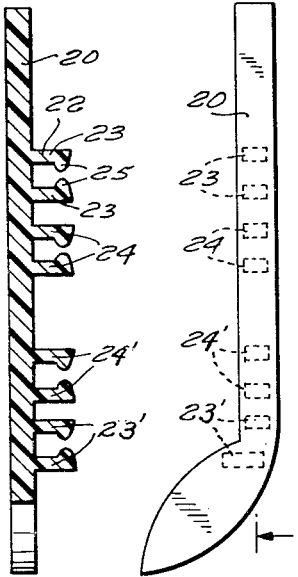
FIG.11.
FIG.10.
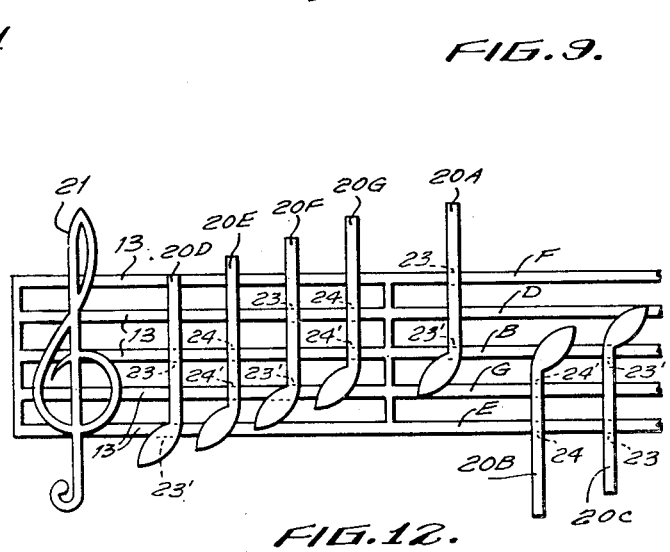
FIG.12.
INVENTOR
BERNHARD ULVAD
BY
ATTORNEY United States Patent Office 2,770,160
Patented Nov. 13, 1956

2,770,160

MUSIC STUDY DEVICE

Bernhard Ulvad, North Leominster, Mass.

Application December 15, 1953, Serial No. 398,258

2 Claims. (Cl. 84—470)

This invention relates to a device for use by children and others as a graphical aid in the study of music.

Generally speaking, the device comprises a simulated musical staff together with simulated clefs and notes, the latter being adapted to be arranged in various positions on the degrees of the staff to indicate different pitches.

Use of the device serves to facilitate reading of musical notation. It also promotes study of composition by permitting various arrangements of the notes on the staff to represent a scale, a chord, or a simple melody. It further serves in the study and teaching of appreciation and discrimination in regards to the pitch of musical sounds. A note may be struck or produced by the student or the teacher on a musical instrument and then a simulated note may be applied to the staff of the device in the proper, or supposed, position to indicate the pitch of the tone that was struck. To this end, a simple musical instrument, such for instance as a xylophone, may be conveniently sold as an accessory or packed in the same box with the device.

The principal object of my invention is to provide a device that will stimulate interest in the study of elementary music.

Another object of my invention is to provide a device that makes the study of music, particularly by a young child, both simple and entertaining.

A further object of my invention is to provide a music study device, of the character described, that is easy to manipulate.

Still further objects of the invention are to provide a device of strong and durable construction, and that is easy and inexpensive to manufacture.

The accompanying drawings illustrate a preferred embodiment of the invention, in which:

Fig. 7 is a fragmentary view showing the manner of applying the clef and notes to the staff;

Fig. 8 is a similar view with a clef or note in attached position;

Fig. 9 is a fragmentary rear view of the showing of Fig. 8;

Fig. 10 is a view in elevation of one of the simulated notes;

Fig. 11 is a sectional view thereof taken on the line 11—11 of Fig. 10; and

Fig. 12 is a plan view of the simulated staff with a simulated clef and a plurality of notes applied thereon.

Figure 1:
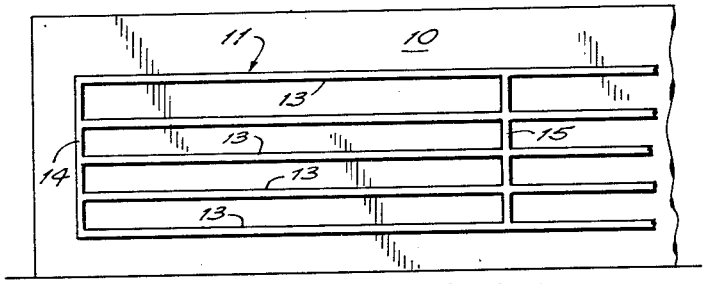
Fig. 1 is a front elevation of the device.
Figure 2:
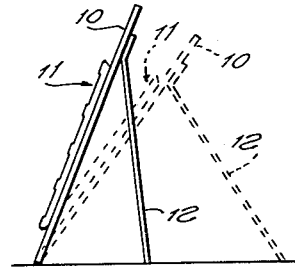
Fig. 2 is an end view thereof.

10 represents a base or board upon the face of which the simulated staff 11 is mounted. The base may be made of cardboard or other suitable material and it may be provided with a folding easel-like prop 12 to support it at convenient angles, as indicated by the full and dotted lines in Fig. 2. If desired, the board may be laid flat on a table or other surface, in which case the prop may be folded down, or entirely omitted.

The staff 11 consists of five horizontal bars 13, a vertical bar 14 at each end, and one or more intermediate vertical bars 15. The intermediate bars serve both to divide the staff into measures and to reenforce the construction. The number of bars provided will depend mainly upon the desired length of the staff. The horizontal bars 13 simulate the five lines of a musical staff, representing the pitches E, G, B, D, and F, respectively.

Figures 4, 5:
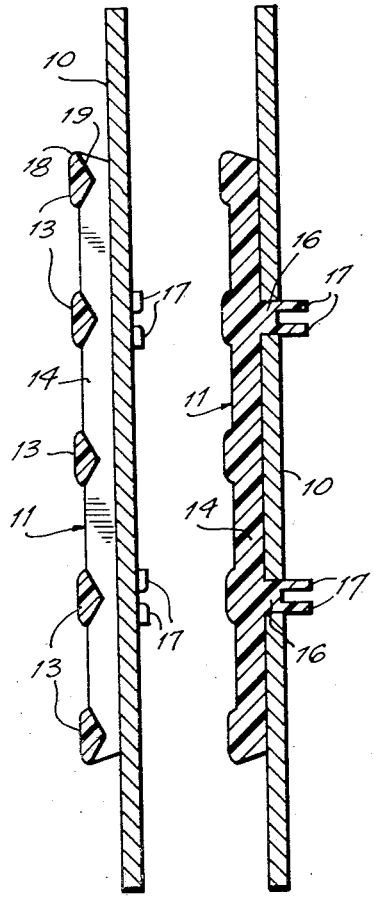
Fig. 4 is a vertical section on the line 4—4 of Fig. 3.
Fig. 5 is a vertical section on the line 5—5 of Fig. 3.
Figure 3:
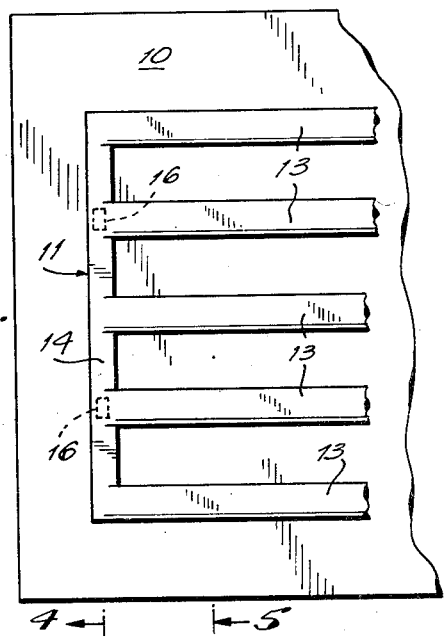
Fig. 3 is a fragmentary face view of the device.
Figure 6:
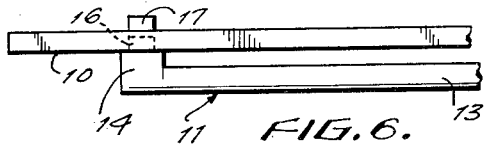
Fig. 6 is a fragmentary top plan view of the device.

The entire staff is preferably molded in one piece of thermoplastic material, although it may be made of other suitable material. Securing members 16 may be molded on the rear surface of the staff at spaced points along the bars 14 and 15, or any of them. As shown, these members each have two arms 17 that pass through openings in the board 10, and are bent down upon the back, as indicated in Figs. 5 and 6. It is to be understood, however, that other suitable means for fastening the staff to the board may be used.

Each of the horizontal bars 13, in the form shown in the drawings, has a plane front face with rounded upper and lower longitudinal edges 18, and rearwardly converging side edges 19. The cross-sectional shape of said bars may, however, be varied somewhat from that shown without interfering with their function as hereinafter described. The portions of the bars 13 that extend between the vertical bars are spaced above the face of the board 10 as shown in Fig. 5.

The simulated notes 20, as well as the clef 21, are preferably made of flexible plastic or other suitable flexible material, and are each formed on the back with lugs or arms 22 arranged in four pairs 23—23' and 24—24'. The lugs of each pair terminate in enlargements or heads 25 having oppositely facing portions formed with rounded surfaces.

In applying the notes 20 to the staff, they are slightly flexed, as indicated by the dotted lines in Fig. 7, to spread the lugs 22 so that on pressing the notes on to the staff the rounded surfaces of the lug-heads 25 will pass easily over the rounded edges 18 of the bars 13 of the staff. On releasing the pressure, the lugs will snap into engagement with the edges of the bars with the heads of the lugs overlapping the edges of the bars, as shown in Figs. 8 and 9. The notes 20 together with their lugs 22 are preferably molded or made in one piece so that the lugs cannot become detached and thus render the note incapable of being applied to the staff.

The two lug-pairs 23—23' and 24—24' of each note 20 are so positioned with respect to each other and with respect to the spacing of the simulated lines or bars 13 of the staff that when the note is applied to the staff, either with its stem extending upward or downward, the note will be attached to two of the bars and thus be held firmly in position.

On reference to Fig. 12, it will be seen that notes representing the pitches or tones D, F, A, and C are held in the staff bars representing the lines E—B, G—D, B—F, and B—E, respectively, by engagement of their two outer pairs of lugs 23—23' with said bars. The notes E, G, and B are held by engagement of the two inner pairs of lugs 24—24' with the staff bars or lines G—B, B—D, and G—E, respectively.

In other words, the notes 20D, 20F, 20A, and 20C are each attached by the outer pairs of lugs 23 and 23' to two of a trio of three bars 13, skipping the intermediate bar, while the notes 20E, 20G, and 20B are each attached by the inner pairs of lugs 24 and 24' to two successive bars.

If desired, additional simulated notes 20 may be provided to be applied in a leger space or a leger line above or below the usual simulated staff.

To detach any note, it is merely necessary to pull or strip it off the bars of the staff. By reason of the flexibility of its attachment, this can be effected with a minimum of effort.

To enhance the attractiveness of the device to a child, the staff and notes may be made of colored plastic, either of the same or different colors. Because of the secure manner of attachment of the notes, the board may be hung on a wall or other vertical surface as well as being laid flat or held at various angles.

While I have illustrated and described a preferred form of the device, it is to be understood that modifications may be made within the scope of the invention as set forth in the claims.

What I claim is:

1. A music study device comprising a base, a simulated staff fixed thereto, said staff having five spaced horizontal bars representing the five lines of a conventional staff and being cross-connected at intervals by vertical bars, each horizontal bar having a plane outer face, rearwardly converging inner face portions, and rounded longitudinal edges, and a plurality of simulated notes of flexible material adapted to be attached to the staff to indicate various pitches, each note having four pairs of lugs disposed in substantially vertical alignment on the back thereof, each lug terminating in an enlarged head having a rounded surface portion, the rounded head portions of the two lugs of any pair facing each other so that they will pass easily over and clamp on the rounded longitudinal edges of any of the two horizontal bars to which the note is applied, two of said lug-pairs being adapted alternatively to engage two of the horizontal bars upon flexing the note to spring the lugs of the two selected pairs, the two outer pairs of lugs being arranged to engage two of a trio of horizontal bars skipping the intermediate one, the two inner pairs being arranged to engage two successive bars.

2. A music study device comprising a base, a simulated staff mounted thereon, said staff including five spaced horizontal bars representing the five lines of a conventional staff, and a plurality of simulated notes of flexible material adapted to be attached to the staff to indicate various pitches, each note having a plurality of lugs on its back, the lugs being disposed in pairs, the lugs of each pair having enlarged heads that face toward each other and that are adapted to be sprung over the longitudinal edges of any selected horizontal bar, upon flexing the note, to clamp the note detachably in place on the bar.

References Cited in the file of this patent

UNITED STATES PATENTS

| | | |
|---|---|---|
| 1,320,746 | Egener | Nov. 4, 1919 |
| 1,754,458 | Cash | Apr. 15, 1930 |
| 1,754,459 | Cash | Apr. 15, 1930 |
| 2,072,511 | Ross | Mar. 2, 1937 |
| 2,082,432 | Von der Linden | June 1, 1937 |